United States Patent
Borglum

(10) Patent No.: US 6,379,485 B1
(45) Date of Patent: Apr. 30, 2002

(54) METHOD OF MAKING CLOSED END CERAMIC FUEL CELL TUBES

(75) Inventor: Brian P. Borglum, Edgewood, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/058,069

(22) Filed: Apr. 9, 1998

(51) Int. Cl.⁷ ............ B32B 31/26; H01M 8/10
(52) U.S. Cl. ............ 156/89.11; 156/89.12; 156/244.11; 156/244.13; 429/31
(58) Field of Search ............ 156/89.11, 89.12, 156/89.16, 89.28, 89.22, 244.11, 244.13; 429/30, 31, 33, 34, 36

(56) References Cited

U.S. PATENT DOCUMENTS

| | | |
|---|---|---|
| 2,914,834 A | 12/1959 | Daniel |
| 4,364,783 A | 12/1982 | Theodore et al. |
| 4,395,468 A | 7/1983 | Isenberg |
| 4,414,337 A | 11/1983 | Ichikawa et al. |
| 4,431,715 A | 2/1984 | Isenberg |
| 4,490,444 A | 12/1984 | Isenberg |
| 4,562,124 A | 12/1985 | Ruka |
| 4,631,238 A | 12/1986 | Ruka |
| 4,728,584 A * | 3/1988 | Isenberg ............ 429/31 |
| 4,748,091 A | 5/1988 | Isenberg |
| 4,751,152 A | 6/1988 | Zymboly |
| 4,791,035 A | 12/1988 | Reichner |
| 4,833,045 A | 5/1989 | Pollack et al. |
| 4,874,678 A | 10/1989 | Reichner |
| 4,876,163 A | 10/1989 | Reichner |
| 4,888,254 A | 12/1989 | Reichner |
| 5,034,023 A * | 7/1991 | Thompson ............ 429/30 X |
| 5,045,169 A * | 9/1991 | Feduska et al. ............ 429/31 X |
| 5,103,871 A | 4/1992 | Misawa et al. |
| 5,108,850 A | 4/1992 | Carlson et al. |
| 5,112,544 A | 5/1992 | Misawa et al. |
| 5,114,803 A * | 5/1992 | Ishihara et al. ............ 429/30 |
| 5,158,837 A * | 10/1992 | Misawa et al. ............ 429/34 |
| 5,227,102 A * | 7/1993 | Yamada |
| 5,258,240 A | 11/1993 | Di Croce et al. |
| 5,273,838 A | 12/1993 | Draper et al. |
| 5,429,644 A * | 7/1995 | Arai et al. |
| 5,786,105 A * | 7/1998 | Matsushima et al. ............ 429/34 |
| 5,993,985 A * | 11/1999 | Borglum |
| 6,217,822 B1 * | 4/2001 | Borglum |

FOREIGN PATENT DOCUMENTS

| | | |
|---|---|---|
| EP | 0462473 | 12/1991 |
| EP | 0521281 | 1/1993 |
| JP | 10-162847 | * 6/1998 |

* cited by examiner

Primary Examiner—Curtis Mayes

(57) ABSTRACT

A method of manufacturing closed end ceramic fuel cell tubes with improved properties and higher manufacturing yield is disclosed. The method involves bonding an unfired cap to a hollow unfired tube to form a compound joint. The assembly is then fired to net shape without subsequent machining. The resultant closed end tube is superior in that it provides a leak-tight seal and its porosity is substantially identical to that of the tube wall. The higher manufacturing yield associated with the present method decreases overall fuel cell cost significantly.

12 Claims, 4 Drawing Sheets

METHOD OF MAKING CLOSED END CERAMIC FUEL CELL TUBES

GOVERNMENT CONTRACT

The Government of the United States of America has certain rights in this invention pursuant to Contract No. DE-FC21-91MC28055 awarded by the U.S. Department of Energy.

FIELD OF THE INVENTION

The present invention relates to fuel cells, and more particularly relates to a method of making closed end ceramic tubes for solid oxide fuel cells and the like.

BACKGROUND INFORMATION

Fuel cells are among the most efficient of power generation devices. One type of solid oxide fuel cell (SOFC) generator has a projected 70 percent net efficiency when used in an integrated SOFC-combustion turbine power system in which the turbine combustor is replaced by a SOFC.

Several different fuel cell designs are known. For example, one type of solid oxide fuel cell consists of an inner porous doped-lanthanum manganite tube having an open end and a closed end, which serves as the support structure for the individual cell, and is also the cathode or air electrode (AE) of the cell. A thin gas-tight yttria-stabilized zirconia electrolyte covers the air electrode except for a relatively thin strip of an interconnection surface, which is a dense gas-tight layer of doped-lanthanum chromite. This strip serves as the electric contacting area to an adjacent cell or, alternatively, to a power contact. A porous nickel-zirconia cermet layer, which is the anode or fuel electrode, covers the electrolyte, but not the interconnection strip. A typical closed end SOFC air electrode tube has a length of about 1.81 m, a diameter of about 2.2 cm and is used in a seal-less SOFC design.

Exemplary fuel cells are disclosed in U.S. Pat. No. 4,431,715 to Isenberg, U.S. Pat. No. 4,395,468 to Isenberg, U.S. Pat. No. 4,490,444 to Isenberg, U.S. Pat. No. 4,562,124 to Ruka, U.S. Pat. No. 4,631,138 to Ruka, U.S. Pat. No. 4,748,091 to Isenberg, U.S. Pat. No. 4,751,152 to Zymboly, U.S. Pat. No. 4,791,035 to Reichner, U.S. Pat. No. 4,833,045 to Pollack, et al., U.S. Pat. No. 4,874,678 to Reichner, U.S. Pat. No. 4,876,163 to Reichner, U.S. Pat. No. 4,888,254 to Reichner, U.S. Pat. No. 5,103,871 to Misawa et al., U.S. Pat. No. 5,108,850 to Carlson et al., U.S. Pat. No. 5,112,544 to Misawa et al., U.S. Pat. No. 5,258,240 to Di Croce et al., and U.S. Pat. No. 5,273,828 to Draper et al., each of which is incorporated herein by reference.

The primary requirements of the closed end of the air electrode for commercial applications are that it has properties that are similar to those of the air electrode tube wall and can be rapidly fabricated, preferably in a high-volume manufacturing facility.

Different techniques have conventionally been used to form the closed end of the air electrode tube. One method is referred to as the pressed plug technique. This process involves forming a rod of air electrode material by extrusion, inserting the rod into a dried, green tube, and applying a uniaxial load. This technique is problematic in that the load applied to the plug material must be sufficient to achieve an adequate bond between the plug and the tube material, but must not be so great as to break the tube. This method also requires controlled drying in order to minimize the possibility of debonding of the plug from the wall and/or cracking of the plug. Plugs made by this method also require machining of the sintered plugged end. The most common problem found in tubes made with this technique is poor bonding at the plug/wall interface. Furthermore, this technique cannot be used to produce closed end ribbed tubular air electrodes, which are being considered for their potential performance enhancement.

An alternate method that has been used to manufacture air electrode tubes is referred to as the cast plug technique. This method involves inserting a cellulose preform into a dried, green tube in order to define the plug internal radius. An air electrode slurry comprising a water-based suspension of AE particles is deposited or cast onto the preform. Precise control of the plug slurry rheology is required to ensure reproducibility. This assembly is then dried slowly in a controlled humidity and temperature chamber to prevent debonding of the plug from the tube wall or the formation of cracks in the plug. Once the air electrode is dry, it is sintered to the desired density and the plugged end is machined or ground to the proper hemispherical radius and plug thickness. The most common problems found in tubes made with this technique are a large difference in porosity between the tube wall and the plug, and poor bonding at the plug/wall interface. Yield problems associated with this technique do not make it a viable commercial option.

Tubes have also been produced using an extruded closed end technique. This technique utilizes a removable die cap that defines the outer hemispherical radius of the close end. With this die cap in place, material is extruded until the closed end is formed. The extrusion pressure is then reduced to zero and the die cap is removed. Extrusion is started again until the required tube length is obtained. Although this technique is an improvement over past methods with respect to closed end homogeneity, it is a start/stop extrusion process which takes a substantial amount of time to perform. In high volume extrusion manufacturing operations, the homogeneity and reproducibility of the extruded product is enhanced by continuous flow as opposed to repeated application and removal of the extrusion load. Closed ends fabricated using this multi-step extrusion process method are not net shape and require post-sintering machining. Additionally, this technique cannot be used to produce closed end ribbed tubular air electrodes.

SUMMARY OF THE INVENTION

The present invention provides a method in which a closed end ceramic SOFC tube is formed by joining a cap to a hollow ceramic tube. The cross-sectional geometry of the ceramic tube may be round, square or any other desired geometric configuration. The ceramic tube may optionally include at least one integral rib. The cap may be flat, hemispherical or any other suitable configuration. The cap and the hollow tube are preferably joined by means of a compound joint, such as a rabbet joint or the like. The closed end tube may comprise an air electrode suitable for use in fuel cells. As used herein, the term "fuel cell" includes SOFCs, oxygen/hydrogen generator type solid oxide electrolyte electrochemical cells, solid oxide electrolyte cells, oxygen sensors and the like.

An object of the present invention is to provide an improved method of making a closed end ceramic fuel cell tube.

Another object of the present invention is to provide a method of making a closed end ceramic fuel cell tube. The method includes the steps of providing an unfired ceramic fuel cell tube, bonding an unfired end cap to an end of the unfired ceramic fuel cell tube to form a compound joint, and firing the ceramic fuel cell tube and end cap to form the closed end ceramic fuel cell tube.

These and other objects of the present invention will be more apparent from the following description.

DETAILED DESCRIPTION OF THE PREFERRED EMBODIMENT

Figure 1:
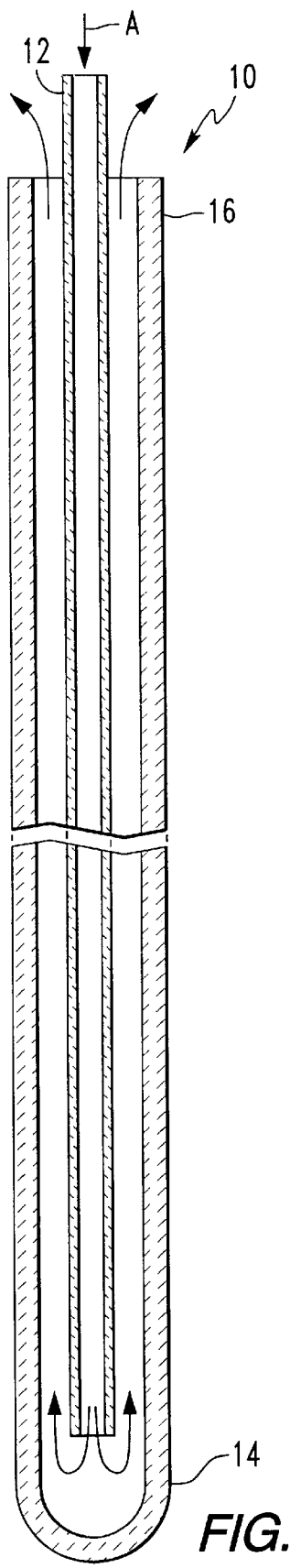
FIG. 1 is a partially schematic sectional view of a solid oxide fuel cell showing an air flow path during operation of the cell.

A closed-end SOFC tube 10 is shown schematically in FIG. 1. Air A is introduced into the cell 10 by a ceramic injector tube 12 that delivers air to the closed end 14 of the tube. The closed end 14 of the cell 10 provides an air return, allowing the air A to flow through the entire length of the cell 10 from the closed end 14 to the open end 16. The integral air return manifold comprising the air injector tube 12 and the closed end 14 of the cell 10 coupled with a controlled leakage seal (not shown) at the open end 16 of the cell provides a conventional seal-less design that does not require absolute or high integrity seals between fuel and air, and which accommodates differential thermal expansion between cells.

The method of the present invention involves bonding an unfired green body cap to an unfired green body tube. This process is illustrated schematically in FIGS. 2a–2c. First, hollow tubes 20 are extruded and dried using any suitable conventional technique. For example, for an air electrode of a SOFC, the ceramic fuel cell powder may comprise $La_{1-x}(M1)_xMn_{1-y}(M2)_yO_3$, where x ranges from 0 to 0.5; M1 consists of calcium, strontium, yttrium, cerium, other appropriate dopants, or combinations thereof; y ranges from 0 to 0.5; and M2 consists of nickel, chromium, zinc, cobalt, other appropriate dopants, or combinations thereof. The solvent may comprise water, propanol, butyl acetate, or butoxyethanol, with water being preferred for many applications. In addition to the ceramic fuel cell powder and solvent, the mixture may include organic binders such as methylcellulose, hydroxypropyl methylcellulose, polyvinyl alcohol, polyvinyl butyral resin, or acrylic polymer, and/or may include plasticizers such as polyethylene glycol, butylbenzyl phthalate, or polymeric fatty acids.

The fuel cell tube 20 may be formed by any suitable method, preferably extrusion. For example, a paste may be made by combining an appropriate mixture of the compounds given above and mixing them under conditions of high shear. An appropriate paste composition could include 70 to 90 weight percent air electrode powder, 5 to 20 weight percent water, 1 to 15 weight percent hydroxypropyl methylcellulose, and 0.1 to 5 weight percent polyethylene glycol. The tube may then be extruded by forcing the paste through a die at elevated pressure (e.g., 800 to 5,000 psi). The shape of the die determines the cross-sectional geometry of the extruded tubes.

The end cap 22 is made in a separate process, preferably by either extrusion or die pressing. In the case of extrusion, flat ribbons are preferably extruded using the same paste formulation as the tube to produce a thickness that is equivalent to that of the wall of the unfired tube. From this ribbon, disk-shaped caps are cut. Alternately, a dry blend of ceramic powder and binder can be uniaxially pressed to yield either a disk-shaped cap or a hemispherical cap having a configuration which forms a complex joint when assembled with the tube, as more fully described below. In this case, a dry formulation consisting of 80 to 98 weight percent air electrode powder, 0.5 to 10 weight percent hydroxypropyl methylcellulose, and 0.01 to 2 weight percent polyethylene glycol is preferred. The resulting mixture is placed in an appropriately sized and shaped die upon which uniaxial pressure in the range of 200 to 10,000 psi is applied to form the end cap.

Figure 2A:
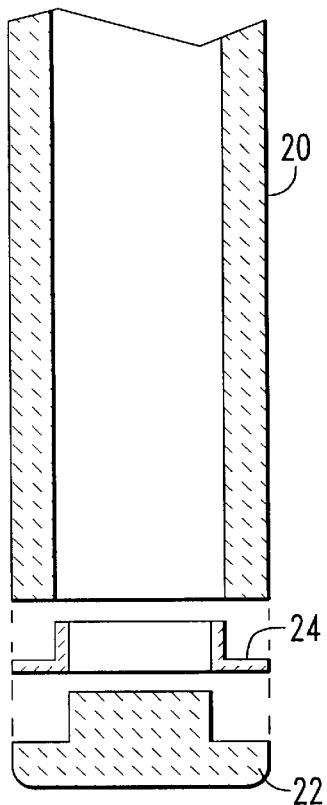
FIGS. 2a–2c are partially schematic side sectional views showing a process for forming a closed end fuel cell tube in accordance with an embodiment of the present invention.
Figure 2B:
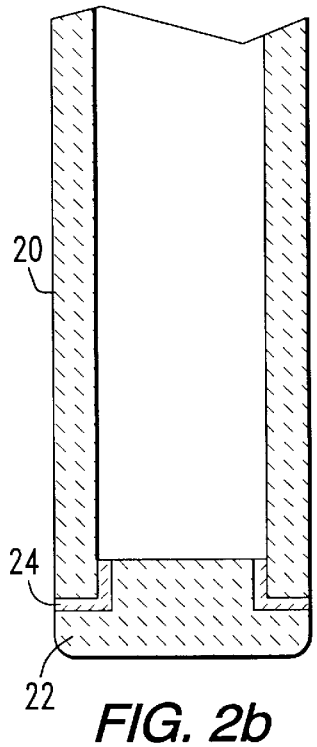
Figure 2C:
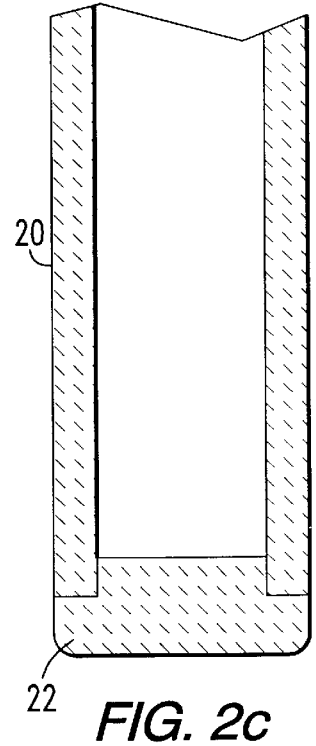

As shown in FIGS. 2a–2c, the end cap 22 is joined to the hollow tube 20 to form a compound joint. In the case of aqueous extrusion paste systems, a diluted paste formulation or slurry 24 is used to achieve this bond. The slurry 24, shown schematically in FIGS. 2a and 2b, is applied to the end of the tube 20. The cap 22 is placed over the slurry 24 and this assembly is allowed to dry to form a compound joint as shown in FIG. 2c. Drying is preferably performed in a vertical orientation such that the weight of the tube 20 aids in the bond. This sequence of steps may be automated. After the tube 20 and end cap 22 assembly is dried, it is fired using conventional sintering parameters. For example, sintering temperatures of from about 1,350 to about 1,650° C. and sintering times of from about 0.5 to about 10 hours may be used.

In one embodiment of the present invention, the method may be used to make ribbed air electrodes for use in high power density solid oxide fuel cells. The presence of ribs in the air electrode tubes prevents most standard plugging methods from being used in these cell types. However, the present method allows closed end ribbed air electrodes and fuel cells to be fabricated. Examples are shown in FIGS. 3–6.

Figure 3:
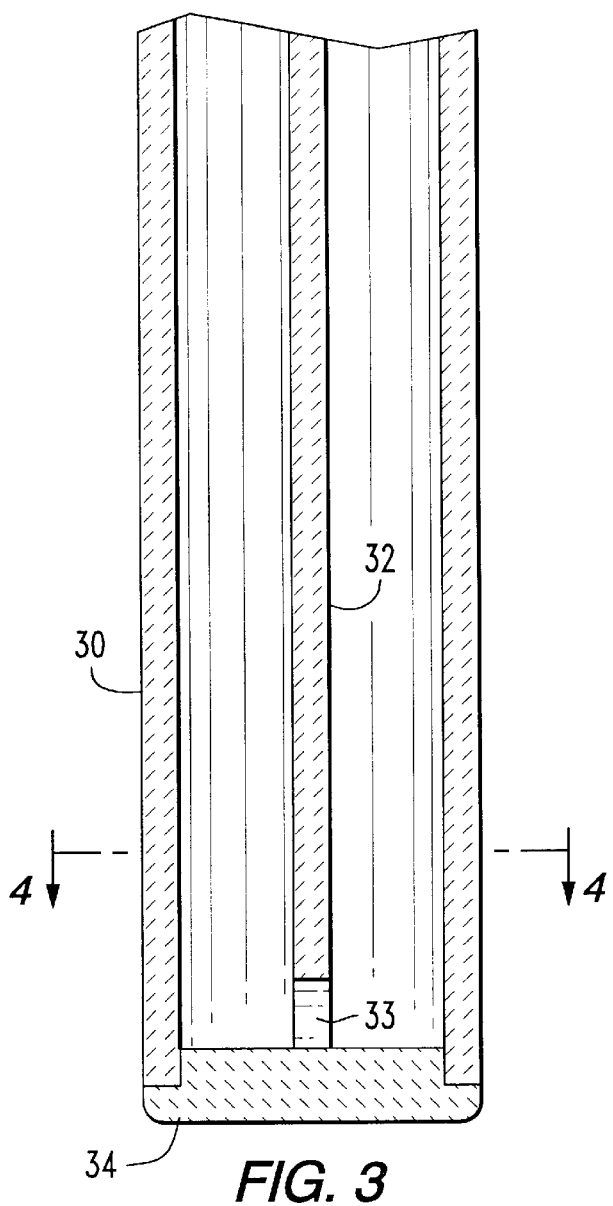
FIG. 3 is a side sectional view of a ribbed cylindrical air electrode including an end cap made in accordance with an embodiment of the present invention.
Figure 4:
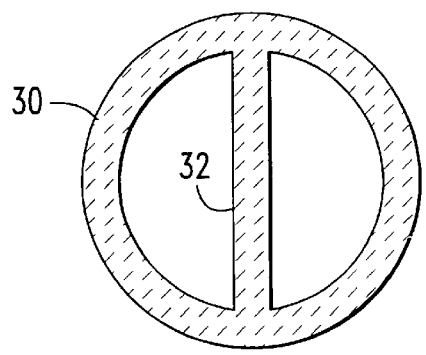
FIG. 4 is a cross-sectional view taken through section 4—4 of FIG. 3.

FIGS. 3 and 4 show views of a ribbed cylindrical air electrode tube 30. The air electrode tube 30 has a circular cross-section and an internal rib 32 which bisects the tube. An opening 33 is provided at the bottom of the rib 32 in order to allow gas to flow from one interior section of the air electrode 30 to the other interior section. An end cap 34 is connected to the bottom of the air electrode tube 30 to form a compound joint in accordance with the present invention. As shown in FIG. 3, the present process produces a compound joint in which the cap 34 forms a homogeneous boundary with the air electrode tube 30.

Figure 5:
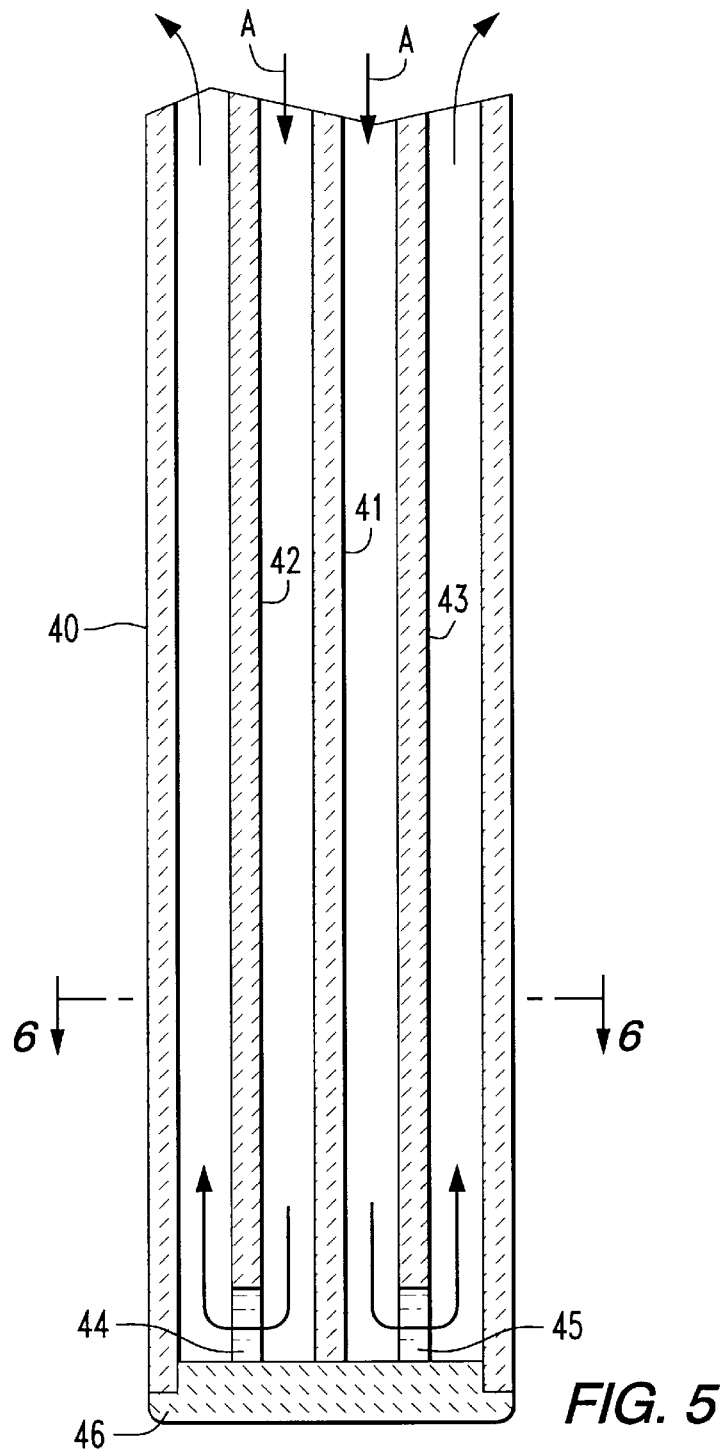
FIG. 5 is a side sectional view of a flattened rib cell including an end cap made in accordance with another embodiment of the present invention.
Figure 6:
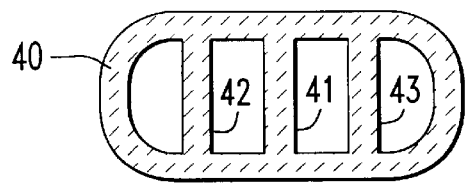
FIG. 6 is a cross-sectional view taken through section 6—6 of FIG. 5.
Figure 7F:
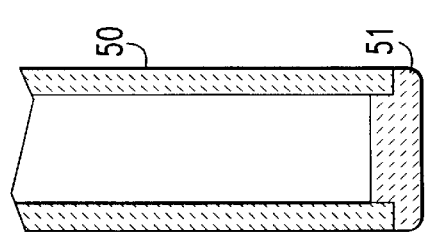
FIGS. 7a–7f are partially schematic side sectional views of ceramic fuel cell tubes illustrating different embodiments of flat end caps in accordance with the present invention.
Figure 7E:
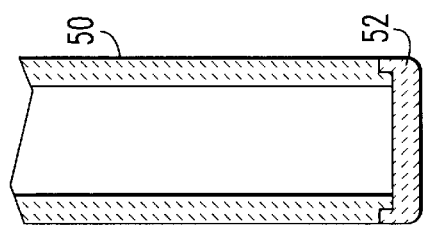
Figure 7D:
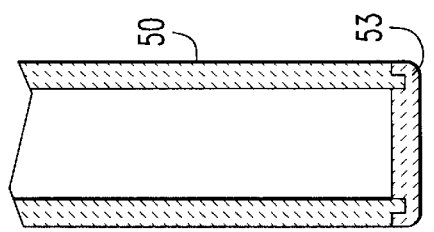
Figure 7C:
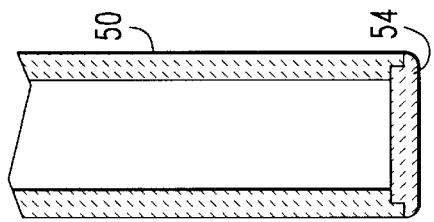
Figure 7B:
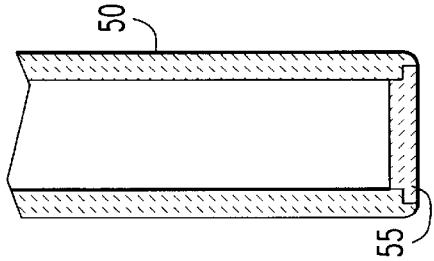
Figure 7A:
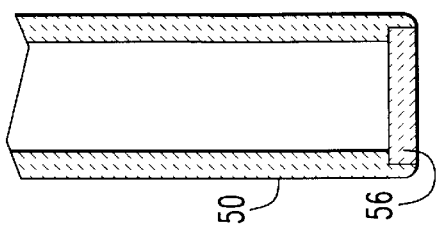

FIGS. 5 and 6 show a closed end flattened ribbed SOFC. In this embodiment, the air electrode tube 40 has a generally ovular flattened cross-section. Internal ribs 41, 42 and 43 are provided inside the air electrode tube 40. Openings 44 and 45 in the ribs 42 and 43 allow air A to flow through the air electrode tube 40 as shown in FIG. 5. An end cap 46 is bonded to the bottom of the air electrode tube 40 to form a compound joint in accordance with the present invention.

Figure 8C:
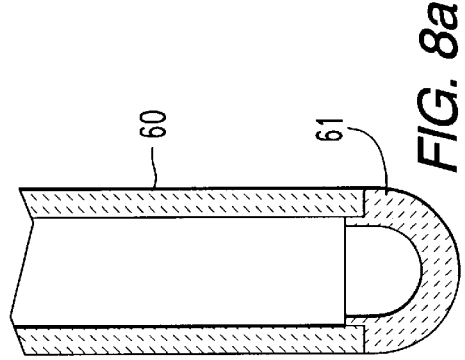
FIGS. 8a–8c are partially schematic side sectional views of ceramic fuel cell tubes illustrating different embodiments of hemispherical end caps in accordance with the present invention.
Figure 8B:
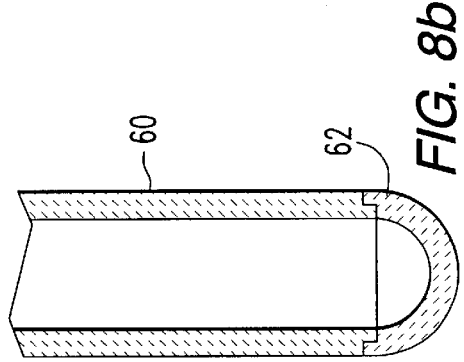
Figure 8A:
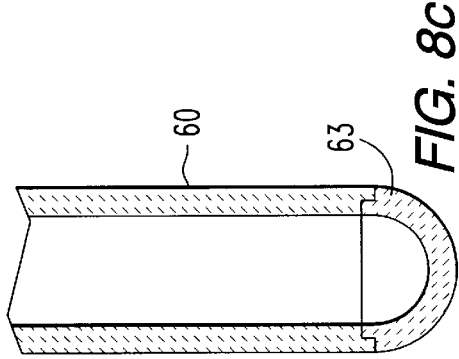

Alternate compound joint configurations of the present invention are shown in FIGS. 7a–7f and 8a–8c. In FIGS. 7a–7f, the air electrode tube 50 is connected to various types of caps 51–56 having generally, flat exterior surfaces and forming compound joints with the tube 50. In FIGS. 8a–8c, the air electrode tube 60 is connected to various types of end caps 61–63 having generally hemispherical shapes and forming compound joints with the tube 60. In accordance with the present invention, the use of compounds joints, such as those shown in FIGS. 7a–7f and 8a–8c, increase the bond area between the cap and the tube wall, thereby providing an improved seal.

The present method may use aqueous extrusion paste systems based on hydroxypropyl methylcellulose ether. However, the process may also be compatible with other aqueous systems or non-aqueous systems that utilize thermoplastic materials. The bonding of the end cap to the tube in the case of a thermoplastic system would require localized application of heat, rather than a slurry.

An air electrode having an end cap in accordance with the present invention may be fabricated into a complete SOFC by conventional methods. For example, electrolyte and fuel electrode layers may be deposited on the air electrode by conventional electrochemical vapor deposition techniques. The resultant cells made with the closed-end technique of the present invention are substantially leak-tight.

The present invention has several advantages over the prior art. The use of a compound joint between the cap and the fuel cell tube provides a relatively large bond area between the components which reduces the risk of gas leaks. The method does not require elaborate dies or fixturing, and no special drying equipment is required. When the end cap is formed from the same extrusion mix as the tube wall, and both are in a fully dried green state, there are substantially no differential shrinkage problems that could give rise to a poor cap/wall bond. Additionally, the porosity of the resultant fired closed end is substantially identical to the tube wall adjacent to the closed-end. The method of the present invention is particularly suited for forming closed end ribbed air electrode tubes.

The present method also allows for the continuous extrusion of tubes. This is in contrast with the conventional extruded plug technique, which is a start/stop extrusion process. In accordance with the present invention, extruded product homogeneity and reproducibility is enhanced by continuous flow rather than the repeated application and removal of the extrusion load. The present process also allows for very rapid extrusion of tubes, and is compatible with large scale tube manufacturing operations. The present end cap technique is well suited to such high volume processing. Furthermore, with the present method, no grinding or machining of the sintered air electrode tube is required. This is in contrast with conventional pressed plug, cast plug and extruded closed end techniques.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of making a closed end ceramic fuel cell tube comprising:

providing an extruded, dried and unfired ceramic fuel cell tube;

bonding an extruded, dried and unfired end cap to an end of the unfired ceramic fuel cell tube to form a compound joint; and firing the ceramic fuel cell tube and end cap to form a sintered closed end ceramic fuel cell tube comprising a sintered ceramic fuel cell tube and a sintered end cap having substantially the same porosities and thickness.

2. The method of claim 1, wherein the compound joint comprises at least one recessed annular ring provided in at least one of the unfired ceramic fuel cell tube and the unfired end cap.

3. The method of claim 1, wherein the compound joint comprises an annular recess provided in the unfired end cap.

4. The method of claim 1, wherein the compound joint comprises an annular recess provided in the unfired ceramic fuel cell tube.

5. The method of claim 1, wherein the compound joint comprises conforming annular recesses in the unfired ceramic fuel cell tube and in the unfired end cap.

6. The method of claim 1, wherein the end cap is substantially flat.

7. The method of claim 1, wherein the unfired ceramic fuel cell tube and unfired end cap are of substantially the same composition.

8. The method of claim 1, wherein the unfired end cap is bonded to the unfired ceramic fuel cell tube by providing a slurry between the unfired end cap and the unfired ceramic fuel cell tube, and drying the slurry.

9. The method of claim 1, wherein the unfired ceramic fuel cell tube has a substantially circular cross section.

10. The method of claim 1, wherein the unfired ceramic fuel cell tube comprises at least one internal rib.

11. The method of claim 1, wherein the sintered closed end ceramic fuel cell tube comprises an air electrode of a solid oxide fuel cell.

12. The method of claim 11, wherein the air electrode comprises doped-lanthanum manganite.

* * * * *